Sept. 16, 1924.
C. E. GLASSER
METALLIC ARC WELDING
Original Filed Sept. 23, 1921   2 Sheets-Sheet 1
1,508,689
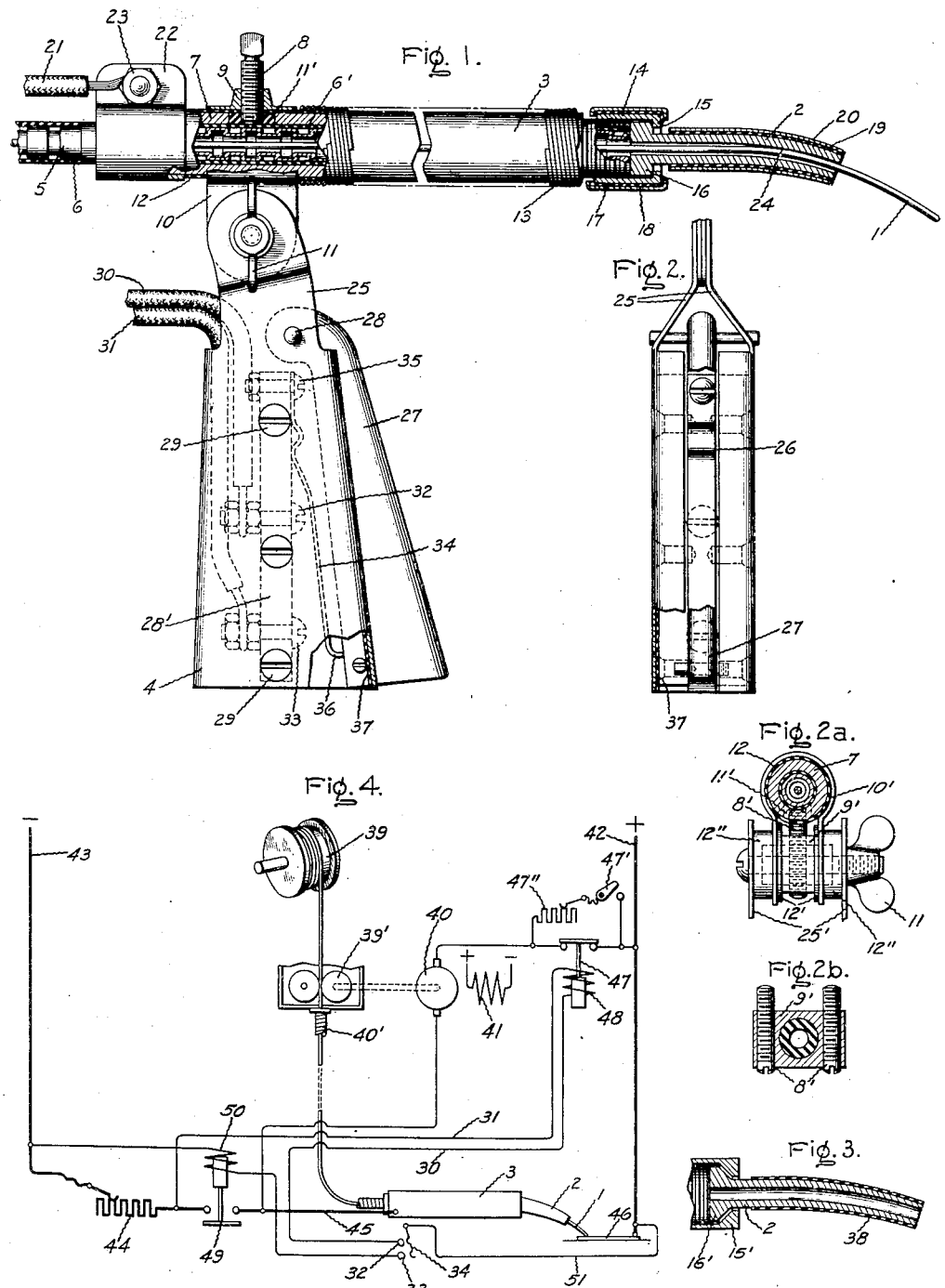
Inventor:
Charles E. Glasser,
by Albert G. Davis
His Attorney.

Sept. 16, 1924.
C. E. GLASSER
METALLIC ARC WELDING
Original Filed Sept. 23, 1921    2 Sheets-Sheet 2
1,508,689
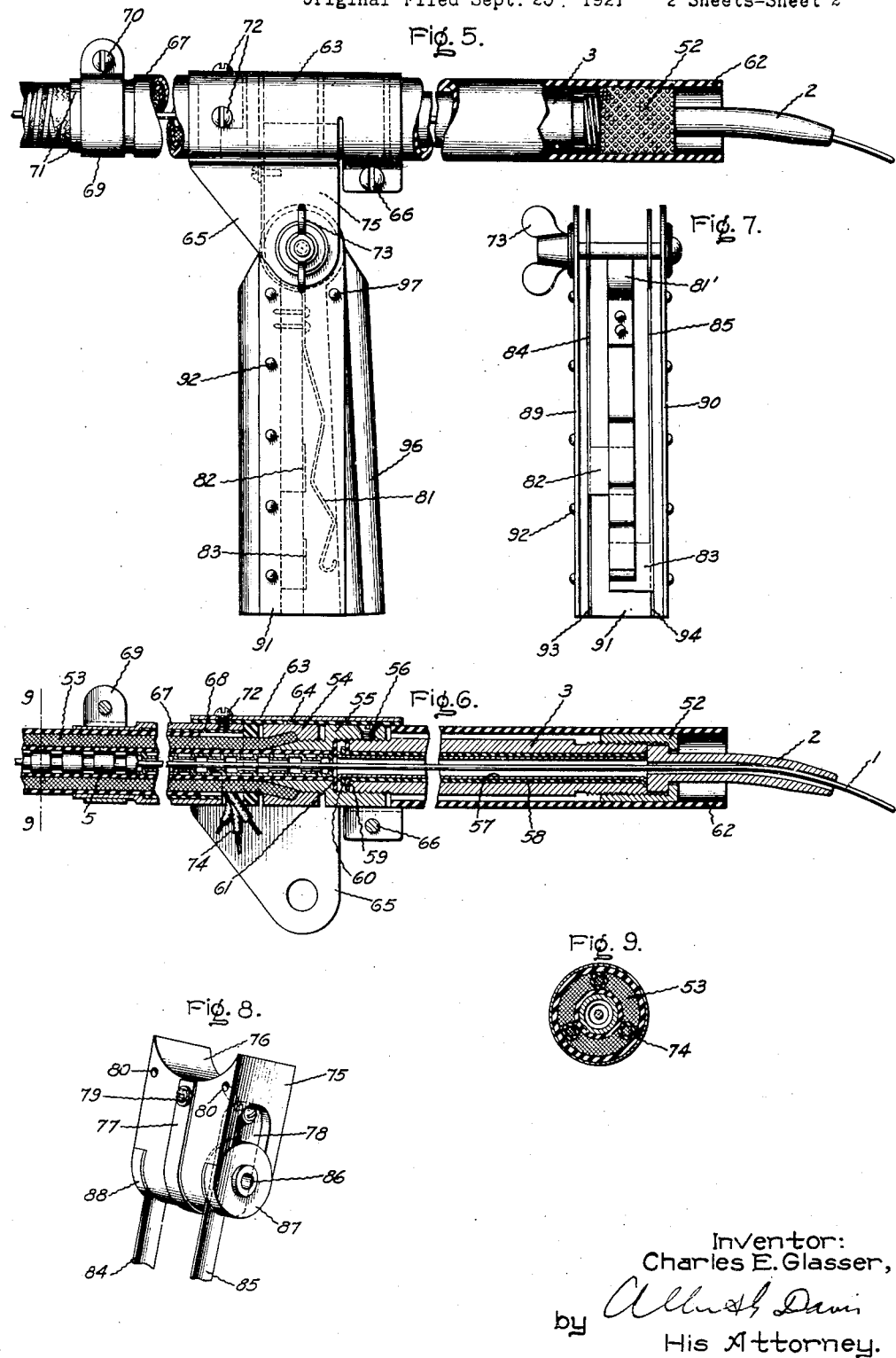
Inventor:
Charles E. Glasser,
by Albert G. Davis
His Attorney.

Patented Sept. 16, 1924.

1,508,689

UNITED STATES PATENT OFFICE.

CHARLES E. GLASSER, OF SCHENECTADY, NEW YORK, ASSIGNOR TO GENERAL ELECTRIC COMPANY, A CORPORATION OF NEW YORK.

METALLIC ARC WELDING.

Application filed September 23, 1921, Serial No. 502,625. Renewed April 9, 1924.

*To all whom it may concern:*

Be it known that I, CHARLES E. GLASSER, a citizen of the United States, residing at Schenectady, in the county of Schenectady, State of New York, have invented certain new and useful Improvements in Metallic Arc Welding, of which the following is a specification.

My invention relates to metallic electric arc welding wherein the arc is maintained between a welding electrode and the work, the electrode being fed toward the work as it is consumed.

An object of my invention is to provide means for leading current into a movable conductor which will be effective, simple, inexpensive and without moving parts.

A further object of my invention is to provide a welding tool which will enable the welding current to be led into the electrode adjacent the end of the tool whereby the current is conducted into the electrode near the arc and the length of electrode carrying current kept very short.

A further object of my invention is to provide a welding tool which will enable the proper angle to be given to the wire as it is delivered from the welding tool.

A further object of my invention is to provide a simple, light welding tool of small diameter which may be conveniently held and manipulated by the welder and which shall enable welding to be done readily in more or less inaccessible places without danger of short circuits between the welding tool and the work.

A further object is to provide a simple and safe circuit controlling system for semi-automatic arc welding systems.

My invention will be better understood from the following description taken in connection with the accompanying drawings and its scope will be pointed out in the appended claims.

In the accompanying drawings, Fig. 1 is a view partly in section of a welding tool embodying my invention; Fig. 2 is a side view with parts broken away showing the pistol grip of the tool shown in Fig. 1; Figs. 2ª and 2ᵇ show a modification of the construction shown in Fig. 1; Fig. 3 shows a modified construction of the electrode delivery nozzle; Fig. 4 is a circuit diagram illustrating the use of my welding tool in a semi-automatic arc welding system; Fig. 5 is a view partly in section showing a preferred form of my welding tool; Fig. 6 is a sectional view of part of the tool shown in Fig. 5; Fig. 7 is a view showing the construction of the pistol grip shown in Fig. 5; Fig. 8 is a perspective showing a detail of the construction of the tool shown in Fig. 5; and Fig. 9 is a section on the line 9—9 of Fig. 6.

In the application of Paul O. Noble, Serial No. 487,875, filed July 27, 1921, for Apparatus for arc welding, assigned to the assignee of this application, there is disclosed an apparatus for metallic arc welding wherein the electrode is pushed through a flexible electrode guide tube to which is attached a welding tool through which the electrode is delivered to the work. My invention relates to an improved form of welding tool adapted to be used with such a guide tube and to improved circuit controlling means for the system.

Referring to Fig. 1 a welding electrode is represented at 1. The welding arc is adapted to be maintained between this electrode and the work, which is not shown. The electrode 1 is delivered to the work through the electrode delivery member or nozzle 2 which is secured to the body 3 of the welding tool. The welding tool is adapted to be held and manipulated by the operator preferably by means of the pistol grip 4. Where desired, however, the pistol grip may be omitted and the body of the tool held directly. The electrode 1 is fed into the body of the tool through the flexible electrode guide tube 5 which is made of flexible metallic hose covered with insulating material 6. The guide tube may be made of spiral steel, tape or wire or other material sufficiently hard to resist the abrasive action of the electrode passing therethrough. The insulation is provided on the guide tube for the reason that the electrode is alive during welding and through its contact with the guide tube renders the guide tube alive. The insulation 6' on the guide tube where it passes into the body of the electrode holder is, in the modification shown in Fig. 1, made of a comparatively stiff mica tube which may be slipped into the opening in the tubular conductor member 7 comprising the body of the tool. The guide tube and insulating tube 6' may be held firmly clamped in the member 7 by suitable clamping means shown as a set screw 8 threaded into an enlargement 9 on the member 10 which is arranged to surround the member 7 and be clamped to the same by means of the wing nut 11. Suitable insulation 11' may be provided to prevent electric contact between the set screw 8 and tubular conductor 7. Insulation 12 is provided around the member 7 so as to keep the external surface of the tool dead to avoid danger from shocks and short circuits during welding. This insulation 12 may be made of rolled mica or other suitable insulating material, and may be held in place by a wire wrapping 13, or a thin metallic tube spun thereover to prevent the insulation from being damaged and to hold it in place should it become softened by the heating of the tool due to the proximity of the welding arc. The electrode delivery nozzle 2 is secured to the member 7 by a clamping nut 14 threaded onto the member 7 and provided with a shoulder 15 for engaging a flange 16 on the delivery nozzle. The delivery nozzle is thus firmly clamped into good mechanical and electrical engagement with the member 7. The clamping nut 14 is preferably provided with an insulated surface so that electrical contact cannot be made with its external surface. As illustrated, the surface of the nut 14 is provided with insulating material 17 held in place by a metal covering 18 spun thereover. The electrode delivery nozzle 2 may be provided with similar insulation 19 held in place by the metal covering 20. Welding current is led into the welding tool in any suitable manner. In the drawing the welding current conductor is indicated at 21 and this conductor is secured to a clamp 22 which is clamped into conducting engagement with a part of the member 7 which is not covered with insulating material by means of the clamping nut 23. The member 22 may be taped or insulated in any other suitable way obvious to those skilled in the art so that the entire external surface of the tool is dead even when the electrode is energized. The welding current which flows from the conductor 21 into one end of the member 7 is led into the electrode 1 adjacent the end of the welding tool from which the electrode is delivered. According to my invention the electrode delivery member or nozzle 2 is slightly curved so that as the electrode 1 is forced through the nozzle it is forced into good conducting contact with the nozzle as shown at 24. As thus arranged there is but a short length of electrode carrying the welding current which is a feature of very great advantage since the welding electrodes ordinarily used are of comparatively high specific resistance and become quite hot from the large welding currents used. The electrode delivery nozzle should be made of fairly hard material to prevent too rapid wear. I have found brass to be a very satisfactory material to use for this purpose. When the electrode delivery nozzle becomes much worn by long use it may be readily replaced by unscrewing the nut 14 and, since but a small amount of material is involved, the expense of replacement is small.

The curved nozzle has the advantage of being able to stand, without injury, the heat to which it is subjected, and has the further advantage of making it possible to make the tool of small diameter. The curved construction of the electrode delivery nozzle in addition to enabling the welding current to be led into the electrode without moving parts performs an additional function, in that it delivers the electrode from the delivery nozzle at a convenient angle. Upon loosening the nut 14 the nozzle may be turned with respect to the body of the tool to any desired position. While I have shown the electrode delivery nozzle as covered with insulation such insulation is not important except where welding is to be done in some inaccessible place, as for example, down inside of a small hole into which the end of the welding tool must be inserted.

While I at present prefer to make the electrode delivery member in the form of a curved tubular member or nozzle, it is to be understood that from the broader aspects of my invention it is immaterial whether or not the member is tubular or curved as long as the opening or passage for the electrode is constructed to bend the electrode as it is passed therethrough so that the member and electrode are forced to make a good electric contact with each other.

In order to support the welding tool conveniently, I provide the pistol grip 4 which is indicated in the drawing as made of a curved sheet of metal having ears 25 which may be clamped against the member 10 by the wing nut 11. Upon loosening the wing nut 11 the pistol grip may be adjusted to any convenient angle. A slot 26 is provided in one side of this curved member and a lever 27 pivoted at 28 is mounted in this slot. The pivoted lever 27 is used where it is desired to operate a control circuit or control circuits for the welding system from the welding tool. An insulating member 28' is shown as secured between the sides of the pistol grip by means of the screws 29. The control wires 30 and 31 for the welding system are shown connected to contacts 32 and 33 mounted on the isulating member 28'. A contact spring 34 is mounted on the member 28' by means of a bolt 35 and a projection 36 on the contact member 34 is arranged to be engaged by the pivoted lever 27 so that when the device is grasped by the operator the contact spring 34 will bridge contacts 32 and 33 to complete the control circuit comprising control wires 30 and 31. If desired a third control wire may be connected to spring 34 at bolt 35. The lever 27 is made of insulating material and the interior of the curved metal member forming the body of the pistol grip 4 is preferably lined with insulating material as indicated at 37.

In order to clamp the electrode guide tube firmly in place, the set screw 8 of Fig. 1 must be firmly tightened. If it should happen to puncture the insulation 6' the set screw and handle would become alive. In order to obviate any danger of shocks or short circuits from such cause the parts may be arranged as shown in Figs. 2ª and 2ᵇ. The set screw 8 is here replaced by a pair of set screws 8' passing through a metal block 9. The wing nut 11 clamps the block 9' between the ears on member 10'. Insulating material 12 and insulating washers 12' together with an insulating bushing around the bolt upon which the wing nut 11 screws, insulate the block 9' from the member 10'. Insulating buttons 11' are provided to insulate the set screws 8' from the tubular conducting member 7 as in Fig. 1. Washers 12'' may be used to facilitate clamping of the lugs 25' of the pistol grip by the bolt and wing nut.

Fig. 3 shows an alternative method of insulating the electrode delivery nozzle 2. In this figure the nozzle is represented as coated with a coating of vitreous heat resisting insulating material 38. Fig 3 also indicates one of the possible variations in the arrangement for making contact between the nozzle 2 and the conducting body of the tool.

As here indicated the flange 16' is tapered to cooperate with a corresponding taper in the nut 15'.

Figure 4 diagrammatically represents a semi-automatic arc welding system embodying features of my invention and illustrating the use therein of a welding tool of the type herein described. The electrode 1 is here indicated as fed from the reel 39 by means of the electrode feed rolls 39' driven by the motor armature 40 whose field winding 41 may be supplied from any suitable source. The terminals of the main supply circuit are indicated at 42 and 43 and current is supplied from this supply circuit, in the modification here shown, to the welding circuit through a regulating device here represented as a resistor 44. It is to be understood, however, that the invention is not limited to any particular character of supply for the welding circuit. It is apparent that the welding circuit may be supplied from a a balancer set such as is shown in the patent to Noble, No. 1,310,131, patented July 15, 1919, or from a generator of the type shown in the patent to Bergmann, No. 1,340,004, patented May 11, 1920. One side of the welding circuit 45 is connected to one end of the welding tool in the manner shown in Fig. 1 and current is led into the electrode at the electrode delivery nozzle 2 in the manner shown in Fig. 1. The electrode is delivered by the electrode feed rolls 39' into the flexible electrode guide tube 40' which corresponds to the guide tube 5 shown in Fig. 1. The other end of this flexible electrode guide tube is connected to the welding tool as in Fig. 1. This feature of using a flexible electrode guide tube is disclosed in the application of Paul O. Noble, 487,875, heretofore referred to. One terminal of the armature 40 of the electrode feed motor is connected to the line 45 and the other side of this motor is arranged to be connected to the line 42, by means of a switch 47 provided with an operating coil 48. Line 42 is connected to the work 46. During normal operation the armature of the electrode feed motor is thus connected directly across the arc and the rate of electrode feed is thus controlled in accordance with the arc voltage to maintain the arc length constant with a high degree of accuracy. Any tendency of the arc length to vary due either to irregularities in the electrode or the work or to movement of the welding tool by the operator is corrected by the automatic electrode feeding mechanism so that it is merely necessary for the operator to direct the electrode to the point of the weld which may be done as easily as a stream of water can be directed from a flexible hose. A contactor 49 provided with an operating coil 50 is arranged to open and close the welding circuit. The switches 47 and 49 are controlled from the contact spring 34 in the pistol grip as in the arrangement shown in Fig. 1. When the operator desires to begin welding he merely picks up the tool and grasps the pistol grip. The first motion of the pivoted lever 27 causes the contact spring 34 to engage contact 32 thus completing the circuit of the coil 48 of switch 47 from the main 42 through the lead 51, contacts 34 and 32, control wire 30, coil 48, control wire 31, and resistor 44, to line 43. Since the welding circuit is open at this time, the full voltage of the mains 42 and 43 is impressed upon the coil 48 and the switch 47 opens the circuit of the armature 40 of the electrode feed motor. This electrode feed motor is designed to operate normally on arc voltage which during welding ranges from 12 to about 20 volts and it is undesirable to impress the open circuit voltage of the welding circuit on this motor since this open circuit voltage may be from 40 to 60 volts. Further movement of the lever 27 causes the contact spring 34 to engage the contact 33 and energizes the coil 50 of the contactor 49. This contactor then closes and applies full voltage to the welding electrode 1. The operator then touches the electrode 1 to the work and draws it back to strike the arc and, since the voltage drops at this time, the coil 48 is weakened so that switch 47 closes and completes the circuit of the armature 40 of the electrode feed motor. This motor now operates to feed the electrode 1 through the flexible guide tube and welding tool at such a rate as may be necessary to maintain the arc at constant length. The operator may break the arc at any time by merely suddenly drawing the tool away from the work or by permitting the spring 34 to open the contactor 49. Whenever the contactor 49 opens, the electrode feed motor 40 is deenergized and comes to a stop. It will be observed that the circuit control arrangement shown requires no skill on the part of the operator and prevents the application of the open circuit voltage of the welding circuit to the electrode feed motor armature.

If it is desired to operate the feed motor 40 while the switch 47 is open, a shunt circuit around switch 47 may be completed by a switch 47'. This operation may be desirable where, for example, it is necessary to thread a new electrode through the electrode guide tube. A resistance 47'' should be provided in the shunt around switch 47 to prevent too great a current flowing through the feed motor. If the switch 47' is left permanently closed the feed motor may operate when the contactor 49 is closed and the welding circuit open at the electrodes. The resistance 47'', however, may be adjusted to keep the speed of operation low.

Since it is possible to design the light relay 47—48 to operate in advance of contactor 49—50 even when both are simultaneously energized, it may appear unnecessary to provide two contacts 32, 33 for the control circuits. If these contacts were replaced by a single contact, however, a short circuit of the electrode to the work would hold contacts 47 and 49 closed independently of contact 34. This will be clear from the fact that a circuit would exist from positive main 42, work 46, electrode 1, lead 45, contact 49, control wire 31, coil 48, control wire 30, contacts 32 and 33, through coil 50 to the negative main 43.

Figs. 5 and 6 show a further modification of the welding tool. In this modification the electrode delivery nozzle 2 is adjustably secured to the tubular body member 3 of the tool by the knurled nut 52. The flexible electrode tube 5 is here represented as having the welding current conductor 53 braided thereon as disclosed in the application of Noble No. 487,875, heretofore referred to. The welding conductor 53 is secured by a tapered nut 54 threaded onto the tapered member 55 into which the tubular member 3 is threaded. A pin or screw 56 may be provided to prevent the member 55 from being readily unscrewed from the member 3 for the purpose hereinafter set forth. The tubular member 3 is provided with an insulated tube extending therethrough to prevent contact between the electrode 1 and the tube 3 within the body of the tube 3. This is represented as comprising a metallic tube 57 surrounded by insulation 58 held in place by expanding the ends of the metallic tube 57. An insulating washer 59 is provided on the inner end of the member 3 and this end of the tube 57 is spun over against a metallic washer 60 resting on the insulating washer 59. An insulating washer 61 is also shown to prevent engagement between the tube 57 and the member 55. An insulating tube 62 fitting tightly over a ribbed or knurled nut 52 is provided for insulating the tubular end of the welding tool and this insulating tube is arranged to project over a part of the electrode delivery nozzle 2 to lessen the likelihood of accidental engagement between the delivery nozzle and the work. The flexible guide tube and conductor is secured to the welding tool and the pistol grip is secured thereto in the following manner: Clamping member 63 made of thin metal provided with an insulating lining 64 and a pair of lugs 65 is arranged to clamp the insulating tube 62 and the member 55 by means of the clamping screw 66. It is not essential, however, that the clamp engage the insulating tube 62 if the insulating tube fits sufficiently tightly on the nut 52. A tubular member 67 provided over part of its length with an insulating lining 68 is arranged to be clamped to the flexible guide tube and conductor by the clamp 69 and clamping screw 70. In order to enable a good clamping action to be secured the end of the tubular member 67 is slitted, as indicated at 71. The tubular member 67 is secured to the member 63 by screws 72. As thus arranged, if it is desirable at any time to change the electrode delivery nozzle 2 the nut 52 may be unscrewed by merely turning the insulating tube 62 which is tightly secured thereon. The screw 56 prevents the tubular member 3 from unscrewing from the tubular member 55 at this time. When the nut 52 has been unscrewed the nozzle 2 may be dropped through the insulating tube and a new nozzle inserted.

The pistol grip shown in Fig. 5 is secured to the lugs 65 on the member 63 by means of a wing nut 73. The modification shown in Fig. 5 is arranged to permit adjustment of the angular relation of the pistol grip to the tool without bending the control wires. Three control wires are indicated at 74 in Figs. 6 and 9. These control wires may be braided onto the electrode guide tube along with the welding conductor as indicated. An insulating block 75 provided with a curved surface 76 for engaging the body of the tool is shown in Fig. 8. This insulating block is provided with three contact pieces, one on the center of the block, indicated at 77, and one on each side of the block. One of these side contact pieces is shown at 78. One of the three control wires is secured to the contact 77, for example, by means of the screw 79, and the other two control wires are passed through openings 80 in the block and secured respectively to the side contact pieces 78. The pistol grip, Fig. 5, is provided with a spring contact 81 arranged to engage in succession contacts 82 and 83 projecting respectively from flat conductors 84 and 85 arranged to be clamped respectively against the side contacts 78 on the block 75 by means of the wing nut 73. An insulating bushing 86 is provided to insulate the bolt with which the wing nut 73 cooperates and insulating washers 87 and 88 are provided on each side of the contact block 75 to insulate the electrical contacts from the metal side plates 89 and 90 of the pistol grip. One end 81' of the contact spring 81 is curved to make contact with the contact 77 on the block 75. It will be obvious that as thus arranged a sliding engagement is made between the contacts on the pistol grip and the contacts on the block 75 so that adjustment of the pistol grip may be made without bending the control wires. In order to secure the contacts 82 and 83 and flat conductors 84 and 85 in a mechanically satisfactory manner I preferably construct the pistol grip in the following manner: An insulating member 91 is riveted to the metal side plates 89 and 90 by the rivets 92 and saw cuts 93 and 94 are made in this member to accommodate the thin flat conductors 84 and 85. The contact pieces 82 and 83 are preferably made integral with the conductors 84 and 85 and are turned over so as to rest upon the insulating strip 91. The lever 96 for operating the contact spring 81 may consist of a piece of insulating material pivoted at 97 in the side plates 89 and 90.

I have herein shown and particularly described certain embodiments of my invention for the purpose of explaining its principles and illustrating its applications but numerous modifications of the details of construction and arrangement of these embodiments and other applications will readily present themselves to those skilled in the art. I, therefore, wish to cover by the following claims all modifications within the spirit of my invention.

What I claim as new and desire to secure by Letters Patent of the United States, is:

1. A device for electric arc welding comprising an electrode delivery member provided with an opening through which an electrode may be moved said opening being constructed to bend the electrode as it is passed therethrough whereby a good electric contact is made between the member and electrode.

2. An apparatus for leading current into a moving conductor, said apparatus comprising a tubular conducting member through which the conductor may be moved, arranged to be connected to a source of current, characterized by the fact that the opening in said tubular member is provided with a curved surface whereby the conductor is forced into good conducting engagement with the tubular member as it is moved relatively thereto.

3. A tool for electric arc welding comprising a body portion adapted to be manually held and a curved nozzle through which an electrode may be moved.

4. An electrode delivery mechanism for electric arc welding comprising a body portion, a curved nozzle through which an electrode may be moved and means whereby the nozzle may be turned with respect to the body portion and secured in any desired position.

5. A tool for electric arc welding comprising a tubular body portion, a curved electrode delivery nozzle through which and the body portion an electrode may be moved, secured to said tubular portion, and means whereby the nozzle may be rotatably adjusted with respect to the tubular portion.

6. A tool for electric arc welding comprising an insulated body portion having an opening longitudinally therethrough through which an electrode may be moved, an electrode delivery nozzle secured to said body portion and heat resisting insulation covering the external surface of said nozzle whereby electric contact between the exterior of said tool and the work is prevented.

7. A tool for electric arc welding comprising a rigid tubular conducting member, an electrode delivery nozzle conductively connected to one end of said member, means for connecting a conductor carrying welding current to the opposite end of said member and an insulated tube secured in said tubular member, whereby a welding electrode moved through said tool can make contact with said nozzle but not with said member.

8. A tool for electric arc welding comprising a tubular body portion through which an electrode may be moved, a pistol grip secured to said body portion, and means for adjusting the angular relation between the pistol grip and the body portion.

9. A tool for electric arc welding comprising a tubular body portion through which an electrode may be moved, a pistol grip, by which said tool may be held, secured to said body portion, a member secured to said body portion provided with contacts adapted to be connected to control wires, means for adjusting the angular relation between the pistol grip and body portion and contacts on the pistol grip in sliding engagement with the contacts on said member whereby the angular adjustment of the pistol grip may be changed without bending the control wires.

10. An apparatus for electric arc welding comprising electrode feeding mechanism, a flexible tube arranged to receive the electrode from the feeding mechanism and a nozzle through which the electrode is delivered to the work secured to the tube, said nozzle being curved to make a good conducting connection with the electrode and means for connecting the nozzle with a source of welding current.

11. An apparatus for electric arc welding comprising electrode feeding mechanism, a flexible tube arranged to receive the electrode from the feeding mechanism, a nozzle through which the electrode is delivered to the work secured to the tube and means for connecting the nozzle with a source of welding current.

12. An electric arc welding system of the class described wherein an electric motor connected to respond to arc voltage is arranged to feed an electrode through a welding tool to the work and wherein switching means are arranged to control the welding circuit and the electrode feed motor circuit, characterized by the provision of a pistol grip for holding the welding tool and by the provision of a circuit controlling switch on the pistol grip arranged to control said switching means to open the electrode feed motor circuit prior to the closing of the welding circuit whereby the application of open circuit voltage to the electrode feed motor is prevented.

13. An electric arc welding system of the class described comprising a welding circuit electrode feeding mechanism, an electrode feed motor connected to respond to arc voltage and arranged to operate said feeding mechanism, a welding tool through which the electrode is adapted to be fed to the work, a switch for controlling the feed motor circuit, a coil for operating said switch arranged to hold the switch open when energized at a voltage approximating open circuit voltage on the welding circuit and to permit said switch to close at a voltage approximating normal arc voltage, a contactor for controlling the welding circuit and circuit controlling means on the welding tool arranged to complete successively a circuit connecting said coil across the arc and a closing circuit for said contactor whereby the application of open circuit voltage to the feed motor is prevented.

In witness whereof, I have hereunto set my hand this 22nd day of September, 1921.

CHARLES E. GLASSER.